United States Patent [19]
Reynolds

[11] Patent Number: 5,926,535
[45] Date of Patent: Jul. 20, 1999

[54] THIRD PARTY CALL CONTROL

[75] Inventor: Henry S. Reynolds, Elgin, Ill.

[73] Assignee: International Business Machines Corporation, Somers, N.Y.

[21] Appl. No.: 08/693,877

[22] Filed: Aug. 5, 1996

[51] Int. Cl.$^6$ .......................... H04M 7/00; H04M 15/00; H04M 3/00; H04Q 3/64
[52] U.S. Cl. ...................... 379/221; 379/127; 379/230; 379/265; 379/309
[58] Field of Search .................................... 379/112, 113, 379/114, 115, 127, 134, 196, 197, 198, 201, 207, 210, 220, 221, 229, 230, 234, 242, 243, 244, 265, 266, 309

[56] References Cited

U.S. PATENT DOCUMENTS

| | | | |
|---|---|---|---|
| 3,111,461 | 11/1963 | Dunning. | |
| 3,542,961 | 11/1970 | Klein et al. | |
| 4,048,452 | 9/1977 | Oehring et al. | 379/113 |
| 4,191,860 | 3/1980 | Weber | 379/115 |
| 4,400,587 | 8/1983 | Taylor et al. | 379/113 |
| 4,510,351 | 4/1985 | Costello et al. | 379/34 |
| 4,611,094 | 9/1986 | Asmuth et al. | 379/201 |
| 4,669,113 | 5/1987 | Ash et al. | 379/221 |
| 4,670,899 | 6/1987 | Brody et al. | 455/453 |
| 4,737,983 | 4/1988 | Freuenthal et al. | 379/221 |
| 4,757,267 | 7/1988 | Riskin | 379/113 |
| 4,769,834 | 9/1988 | Billinger et al. | 379/112 |
| 4,788,718 | 11/1988 | McNabb et al. | 379/113 |
| 4,908,850 | 3/1990 | Masson et al. | 379/88.26 |
| 4,953,204 | 8/1990 | Cuschleg, Jr. et al. | 379/266 |
| 4,974,256 | 11/1990 | Cyr et al. | 379/113 |
| 5,095,505 | 3/1992 | Finucane et al. | 379/201 |
| 5,253,288 | 10/1993 | Frey et al. | 379/265 X |
| 5,291,550 | 3/1994 | Levy et al. | 379/242 |
| 5,448,633 | 9/1995 | Jamaleddin et al. | 379/265 X |
| 5,452,350 | 9/1995 | Reynolds et al. | 379/220 |
| 5,524,147 | 6/1996 | Bean | 379/266 X |

*Primary Examiner*—Harry S. Hong
*Attorney, Agent, or Firm*—Wood, Phillips, VanSanten, Clark & Mortimer

[57] ABSTRACT

A subscriber call routing system is used for routing a call initiated in a carrier public switched telephone network to any one of a plurality of different subscriber resources for a subscriber number. The routing system includes a call manager for receiving a connection request from the PSTN for any call placed to the subscriber number, the connection request including call identification information including indicia relating to the call, and developing a routing request. A routing processing system is operatively associated with the call manager and in response to a routing request uses a stored routing algorithm for selecting one of the subscriber resources to receive the call. The routing processing system transmits a request to the selected subscriber resource for acceptance of the call. A telephone interface application is operatively associated with each of the subscriber resources for receiving a request from the routing processing system for acceptance of the call and returns an acceptance command to the routing processing system to accept the call or returns a rejection command to the routing processing system to reject the call. The call manager sends a response to the PSTN designating the selected subscriber resource to receive the call responsive to receiving the acceptance command or developing a routing request to the routing processing system responsive to receiving the rejection command. The telephone interface application can also transfer a routing request to the routing processing system to re-route a call previously received by its associated subscriber resource.

8 Claims, 8 Drawing Sheets

THIRD PARTY CALL CONTROL

FIELD OF THE INVENTION

This invention relates to the field of telephony and, more particularly, to a system where calls are routed based on interaction with the desired resource selected to receive the call.

BACKGROUND OF THE INVENTION

A telephone system, in its most basic form, comprises one individual dialing a telephone number assigned to another individual. With such a system there is a one-to-one relationship between the dialed number and the destination. The telephone system is also designed to provide special calling services using special inbound telephone numbers. These numbers currently utilize the area codes 700, 800, 888, or 900. Particularly, businesses arrange for the use of a particular 800 or 888 number to allow customers, at no cost, to call and transact business. Conversely, with a 900 number the customer is charged for the service.

During the early 1980's, the long distance carriers removed 800 number translation and routing from switching systems and instead placed it in a call routing database, referred to as a "service control point" (SCP). This architectural implementation allowed a single nationwide free calling number to be routed to any one of a plurality of subscriber destinations. For example, a caller may wish to place an order with a company, inquire about the status of an account, or obtain information about the company's products or services. The SCP must be configured to make the determination as to which of the destinations should receive a particular call, i.e. where the call should be routed. The general type of subscriber service desired may be selected by dialing a particular number, with different numbers corresponding to different services. Alternatively, subscriber may have a single number and utilize prompting whereby additional digits are entered by the caller to specify the particular service desired. All of this information was used by the SCP to make the routing decision.

In response to a call routing inquiry from a carrier switched node, the SCP makes the routing decision based on some combination of specified criteria, namely, originating area code and/or exchange, time of day, day of week, date, and any caller entered digits. These call characteristics are compared to call screening criteria resident in the SCP in the form of a "routing tree" to determine the destination to which the call should be routed. The call routing response results in the call either being routed to a specific location or allocated among a set of locations using preselected percentages. The subscriber may change the call screening process and call allocation percentages by inputting these changes to the SCP in the form of a newer revised routing tree.

U.S. Pat. No. 5,452,350, assigned to the assignee of the present application, disclosed an improvement in routing systems in which routing decision were made outside of the public switched telephone network. Under that system, calls could be routed based on the availability of agents or other resources for handling the calls. Calls were load balanced across multiple subscriber resources at the same or different locations to minimize queuing and maximize resource productivity. Based on screening performed on call characteristics and caller attributes, several subscriber resources could handle the call. Additional criteria provided by the subscriber specifies how to choose among the alternate resources. This criteria included precedence level information used to rank the alternate resource and performance information used to determine the maximum time callers were allowed to wait in queue for each resource at each destination.

With such prior systems, once a routing decision was made, then the call was routed to the selected destination. There was no opportunity for the selected destination to participate in the decision. Once the call is received, then the call could not subsequently be rerouted using the same criteria without the caller terminating the call and placing a new call.

The present invention provides improvements over prior art call routing systems, as discussed more specifically below.

SUMMARY OF THE INVENTION

In accordance with the invention, a call routing system is provided in which a resource is queried to determine if it will accept a call prior to actual routing of the call.

In accordance with another aspect of the invention there is provided a call routing system which allows a resource which has received a call to request further action by the telephone network on the specific call.

There is provided in accordance with a further aspect of the invention a call routing system which in which a call is uniquely identified from all other calls in a telephone network throughout its life in the telephone network.

There is provided in accordance with still a further aspect of the invention a call routing system which chooses an information processing algorithm to forward data back to the telephone network for future processing.

Broadly, there is disclosed herein a subscriber call routing system for routing a call initiated in a carrier public switched telephone network to any one of a plurality of different subscriber resources for a subscriber number. The routing system includes receive processing means for receiving a routing query from the PSTN for any call placed to the subscriber number, the routing query including call identification information including indicia relating to the call, and developing a routing request. Routing processing means are operatively associated with the receive processing means in response to a routing request and using a stored routing algorithm for selecting one of the subscriber resources to receive the call. The routing processing means includes means for transmitting a request to the selected subscriber resource for acceptance of the call. Telephone interface processing means are operatively associated with each of the subscriber resources for receiving a request from the routing processing means for acceptance of the call and returning an acceptance command to the routing processing means to accept the call or returning a rejection command to the routing processing means to reject the call. The receive processing means sends a response to the PSTN designating the selected subscriber resource to receive the call responsive to receiving the acceptance command or developing a further routing request responsive to receiving the rejection command.

It is a feature of the invention that the receive processing means includes means for assigning a unique ID to the call, the ID remaining with the call throughout existence of the call.

It is another feature of the invention of the telephone interface processing means includes means for transferring a routing request to the routing processing means to reroute a call previously received by its associated subscriber resource. The routing request transferred from the telephone interface means identifies a specific subscriber resource to receive the call.

It is a further feature of the invention that the rejection command transferred from the telephone interface means identifies a specific subscriber resource to receive the call.

It is a further feature of the invention to provide means for storing the call identification information, the stored identification information being used by the routing processing means for selecting one of the subscriber resources to receive the call. The telephone interface processing means includes means for updating the stored call identification information during processing of the call.

It is yet another feature of the invention that the telephone interface means is adapted to begin local processing of the call prior to the call arriving at the selected resource.

The above features are accomplished using cooperative processing between telephone network resources and local information processing environments. These elements are loosely coupled to one another through a data communication network. One end of the network terminates at an enhanced services platform (ESP). The exterminates of the network are connected to the local information processing environments at the individual sites or resources to receive the call. The ESP bridges the two environments. The ESP supports the termination of voice segments and the interface to the information processing environment through a data communication network.

Further features and advantages of the invention will be readily apparent from the specification and from the drawings.

DETAILED DESCRIPTION OF THE INVENTION

Figure 1:
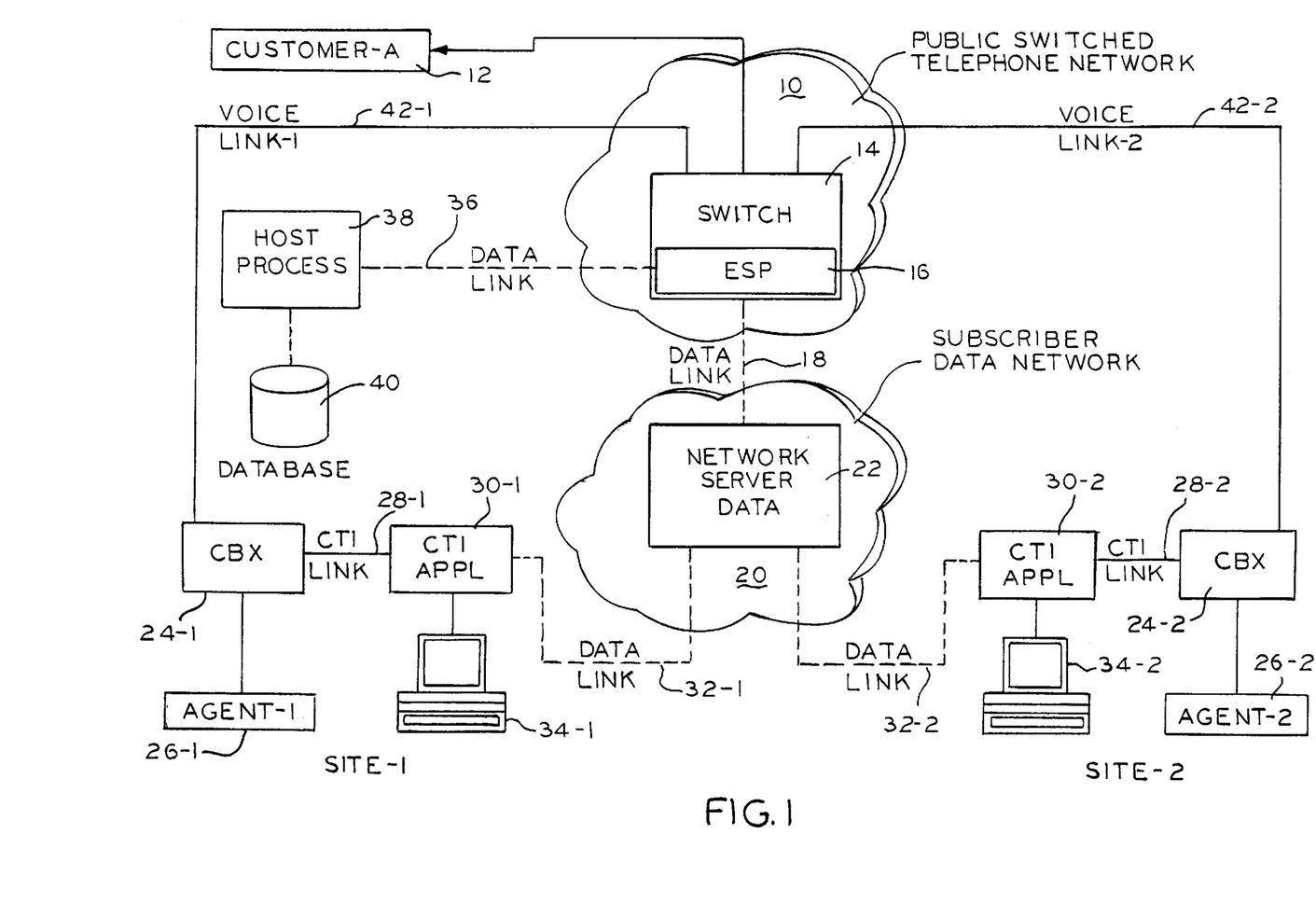
FIG. 1 is a diagrammatic/block diagram illustrating basic elements in the public switched telephone network and the subscriber network in accordance with the invention.

With reference to FIG. 1, a diagrammatic/block diagram illustrates a subscriber call routing processing system used in accordance with the invention. The system is designed to allow a subscriber the ability to control routing of inbound NOO (currently areas codes 700, 800, 888 or 900) telephone calls, or calls to other specified numbers, to a desired site or resource based on subscriber supplied routing criteria and by negotiation with the particular site or resource. This embodiment of the invention uses area codes 800 or 900 but can easily be extended to support any inbound service and any numbering plan.

The system utilizes the facilities of the public switched telephone network (PSTN) 10 provided by one or more network carriers. These carriers include, for example, Sprint, MCI, AT&T and any local exchange carrier. A caller, identified as customer A, originates a call at a telephone 12 by dialing a number assigned to the particular subscriber. The call is connected to one of many carrier switches 14 in the PSTN 10. The switch 14 to which the call is transferred is dependent on the particular subscriber number dialed. Associated with the switch 14 is an enhanced services platform (ESP) 16 according to the invention. In accordance with the invention, the ESP 16 is a block of the subscriber network which makes routing decisions outside of the public switched telephone network, i.e. the decision is made by other than the carrier. While the ESP 16 is illustrated within the PSTN 10, the ESP 16 is not actually a component of the PSTN. Nevertheless, with different architecture the ESP could be located within the PSTN.

The ESP 16 is connected via a data link 18 to a subscriber data network 20. The subscriber data network 20 includes a network server 22 which acts as an interface between the ESP and plural subscriber resources, such as are located at site 1 and site 2. Located at each site is a computer branch exchange (CBX) 24 to which a resource, such as telephone receiving equipment 26 is connected. The components at each site are identified herein with a generic reference numeral prefix, followed by a suffix representing the number of the site. The CBX 24 is similar to a conventional PBX. The CBX 24 is connected via a link 28 to a computer telephony interface (CTI) application 30. The CTI application 30 is connected via a data link 32 to the network server 22. A terminal 34 is provided for controlling operation of the CTI application 30. The ESP 16 is also connected via a data link 36 to a host process 38 associated with a database 40.

As will be further described, enhanced telephone features are activated by the process of a telephone call being terminated at the ESP 16. The type of telephone call can either an INWATS or OUTWATS call. The only requirement is that one segment of the call is terminated at the ESP. The call is routed to the ESP through any one of current telephone routing mechanisms.

Once the call arrives at the ESP 16, information is collected about the call and the customer. Some of this information may be obtained from the PSTN, the customer or by accessing the database 40 via the host process 38. Upon the completion of the collection process the ESP 16 determines the resource that can best service the call. Prior to routing the call, the ESP queries the resource to determine if it will accept the call. The query process is accomplished through the data network 20 by transmitting a query datagram to the specific resource. The resource receives and responds to the query request. The receiving site may respond with an accept datagram thereby indicating that the call should be bridged through the ESP to the site via a voice link 42. If, on the other hand, the resource forwards a reject datagram to the ESP, then the resource may respond with a specific destination or a new destination must be determined for the termination of the call. The ESP then repeats the resource selection process to determine the next suitable destination for the call. Once determined, the negotiation process is initiated for the new destination.

A resource that accepts the call has access to the information that has been collected by the network about the call and the customer. This information accompanies the original query datagram. Thus, the resource can begin local processing of the customer prior to the call arriving at the resource. Upon termination at the site, the voice call is associated with the correct query datagram that was previously sent to the destination. The local information process accomplishes this by matching the datagram's identification with the voice segment's identification.

After the call has arrived at the site, it may be necessary for the site to request services from the telephone network. An example of a service request could be the transfer of the original voice segment to another resource. This is accomplished by the original site transmitting an external trigger message to the ESP 16. The trigger message contains the identification of the call to be transferred to a new site. The call identification defines a specific call from all other calls in the network in the form of an ID so that the ESP 16 can select the correct call for the request. Along with the external trigger message the site may include any customer data that was collected locally. This information may be accessed by the ESP 16 and subsequently forwarded to the next destination. The ESP 16 receives the external trigger message, locates the desired voice segment, terminates the voice segment at the requesting site, queues the voice segment on the ESP 16 and analyzes the request. If the request requires the network to determine a new site, then the selection process is repeated. It is possible for the original resource to know the exact identity of the new resource. In this instance, the ESP 16 bypasses the selection process and begins with the call negotiation phase of the call for the designated resource.

Figure 2:
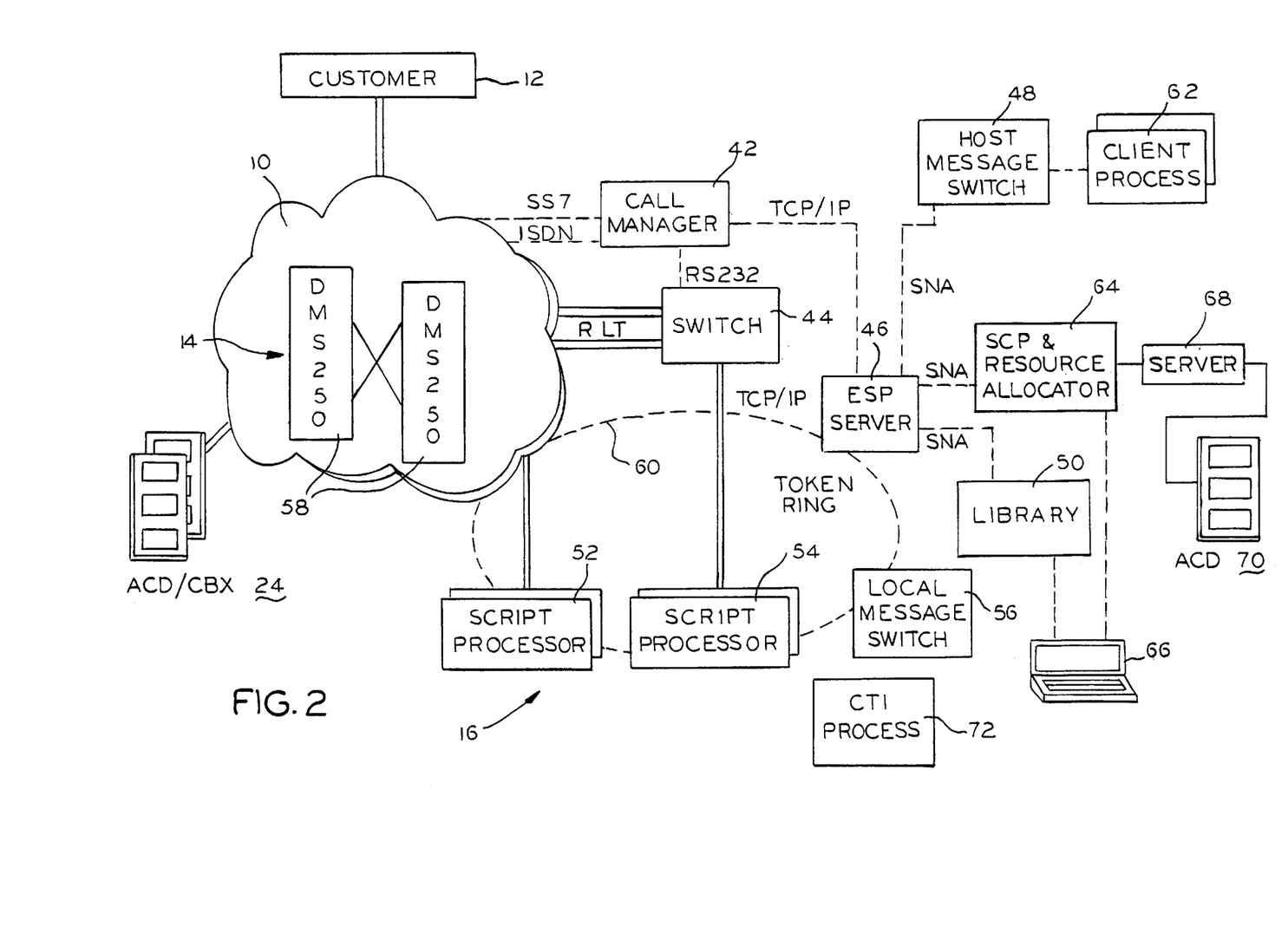
FIG. 2 is a more detailed block diagram illustrating the ESP of FIG. 1 in greater detail.

Referring to FIG. 2, the system of FIG. 1 is illustrated in greater detail, particularly the ESP 16. As is apparent, the block diagram of FIG. 2 illustrates the interconnection of various components of FIG. 1 in greater detail than is shown in the block diagram of FIG. 1.

The ESP 16 comprises a call manager 42, a switch 44, an ESP server 46, a host message switch 48, a library 50, script processors 52 and 54 and a local message switch 56. The PSTN 10 is illustrated as including a switch 14 in the form of an access tandem comprising a pair of DMS 250 switches 58 of conventional construction. Connected to the PSTN 10 are conventional ACD's and CBX's, such as the CBX 24 discussed above.

The ESP server 46, the local message switch 56 and the script processors 52 and 54 communicate via a conventional token ring network 60. The switch 44 is connected via a release line trunk, labelled RLT, to the PSTN 10.

The call manager 42 communicates with the PSTN 10 via an SS7 connection or via an information service data network (ISDN). The call manager 42 receives network messages for a connection request for any call placed to the subscriber number, begins call setup procedures by developing a start script request, and controls operation of the switch 44 via an RS232 interface. The switch 44 is a "dumb" switch being controlled entirely by the call manager 42. The call manager 42 is connected via a TCP/IP interface to the ESP server 46. The ESP server 46 controls the process of handling the calls. The ESP server 46 receives the connection request. The ESP server 46 selects a script processor 52 or 54 to execute the script that will process the call connection request. The ESP server 46 connects the customer's call path to the selected script processor 52 or 54 through the switch 44. The script processor 52 or 54 can communicate with client processes 62 via the host message switch 48 to aid in the routing process. The client processes 62 comprise the host process 38 and database 40, discussed above. The ESP server 46 is also connected to a service control point (SCP) and resource allocator 64 and the library 50. The library 50 and SCP and resource allocator 64 are connected to a terminal 66. The library 50 is used for storing scripts, described below, implemented by the script processors 52 and 54. The SCP and resource allocator 64 is used for making routing decision using a stored algorithm based on criteria such as specified in U.S. Pat. No. 4,542,350, the specification of which is hereby incorporated by reference herein. The SCP and resource allocator 64 is connected via a server 68 to ACD's 70 for determining resource status information and the like, as described in the '350 patent incorporated by reference herein.

The local message switch 56 is the point that connects to the subscriber data network 20 and acts as an interface to CTI processes 72. The local message switch 56 comprises a table that reads messages to be routed to the CTI processes 72 and in turn acts on responses. The local message switch 56 communicates with the other devices via the token ring 60, as illustrated. After a routing decision is made, then the local message switch is used to transmit a request to the selected subscriber resource for acceptance of the call.

Referring to FIGS. 3A–3D, a flow diagram illustrates the process or script implemented in the ESP 16 for routing calls. While a single flow diagram is illustrated, the various process steps are implemented in combination by the ESP server 46, the local message switch 56 and the script processors 52 and 54 all intercommunicating on the token ring 60. The routing process begins at a decision block 100. The routing process can be initiated by a call terminated from the PSTN 10 via the switch 14 to the ESP 16. Alternatively, the routing process can be initiated by receiving an external trigger from a CTI application 30.

Figure 3A:
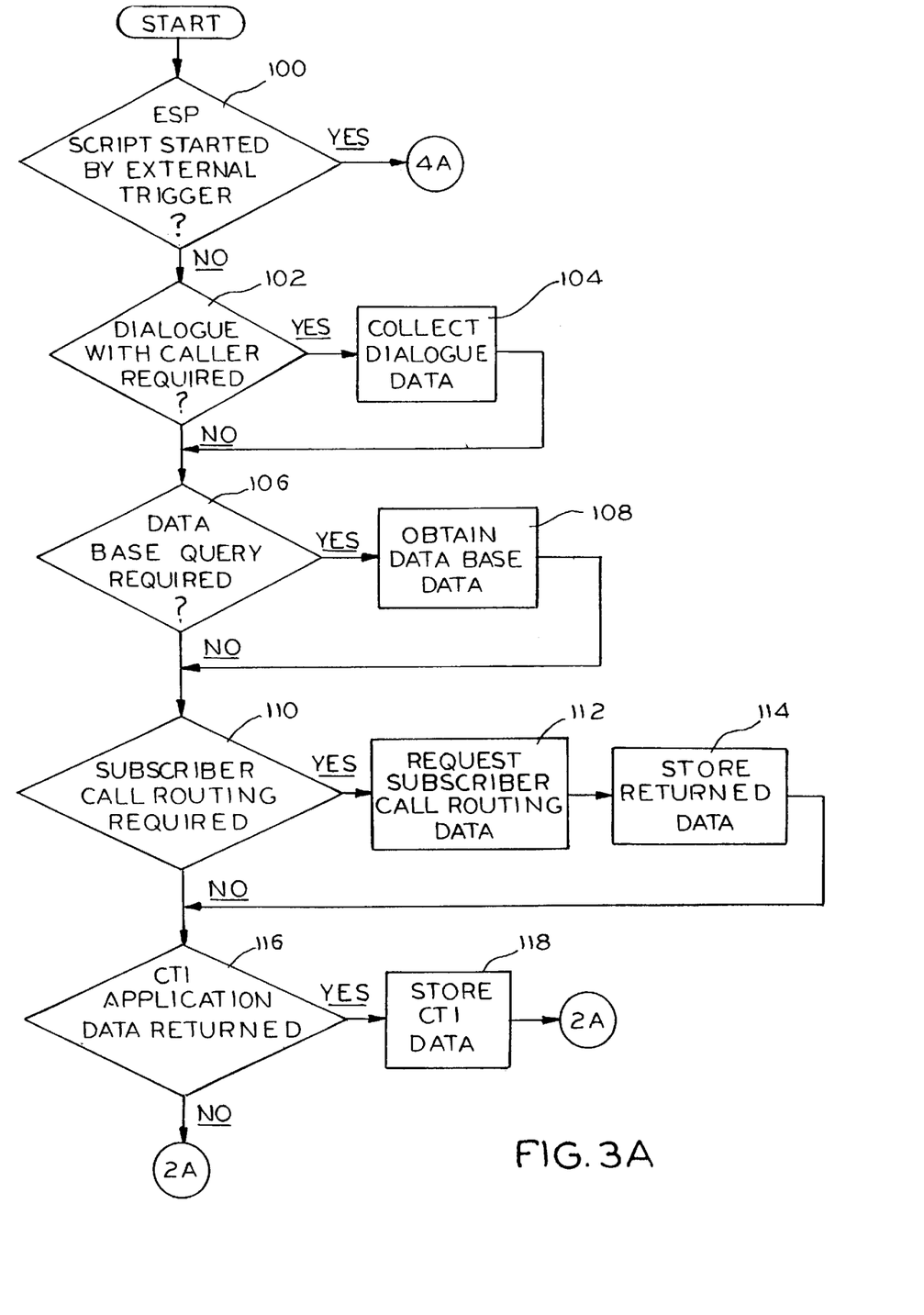
FIGS. 3A–3D comprise a flow diagram illustrating operation of a script implemented in ESP of FIG. 1.

If the script is not started by an external trigger, then a decision block 102 determines if a dialog with the caller is required. The dialog is in the form of interactive voice response where the caller enters data to define call criteria, as discussed above. If there is to be a dialog, then the dialog is conducted by the script processor 52 which collects dialog data at a block 104. Thereafter, a decision block 106 determines if query of the database 40 is required. If so, then the customer database data is obtained and stored at a block 108. Thereafter, a decision block 110 determines if subscriber call routing is required. If a routing decision is required, then subscriber call routing data is requested at a block 112 from the allocator 64 and the returned data is stored at a block 114.

A decision block 11 6 then determines if CTI application data has been returned for the call. If so, the data is stored at a block 118. A decision block 120 determines if call context data is required. The call context data comprises information from the PSTN 10 and the number 20 called. This information is stored at a block 122.

Figure 3B:
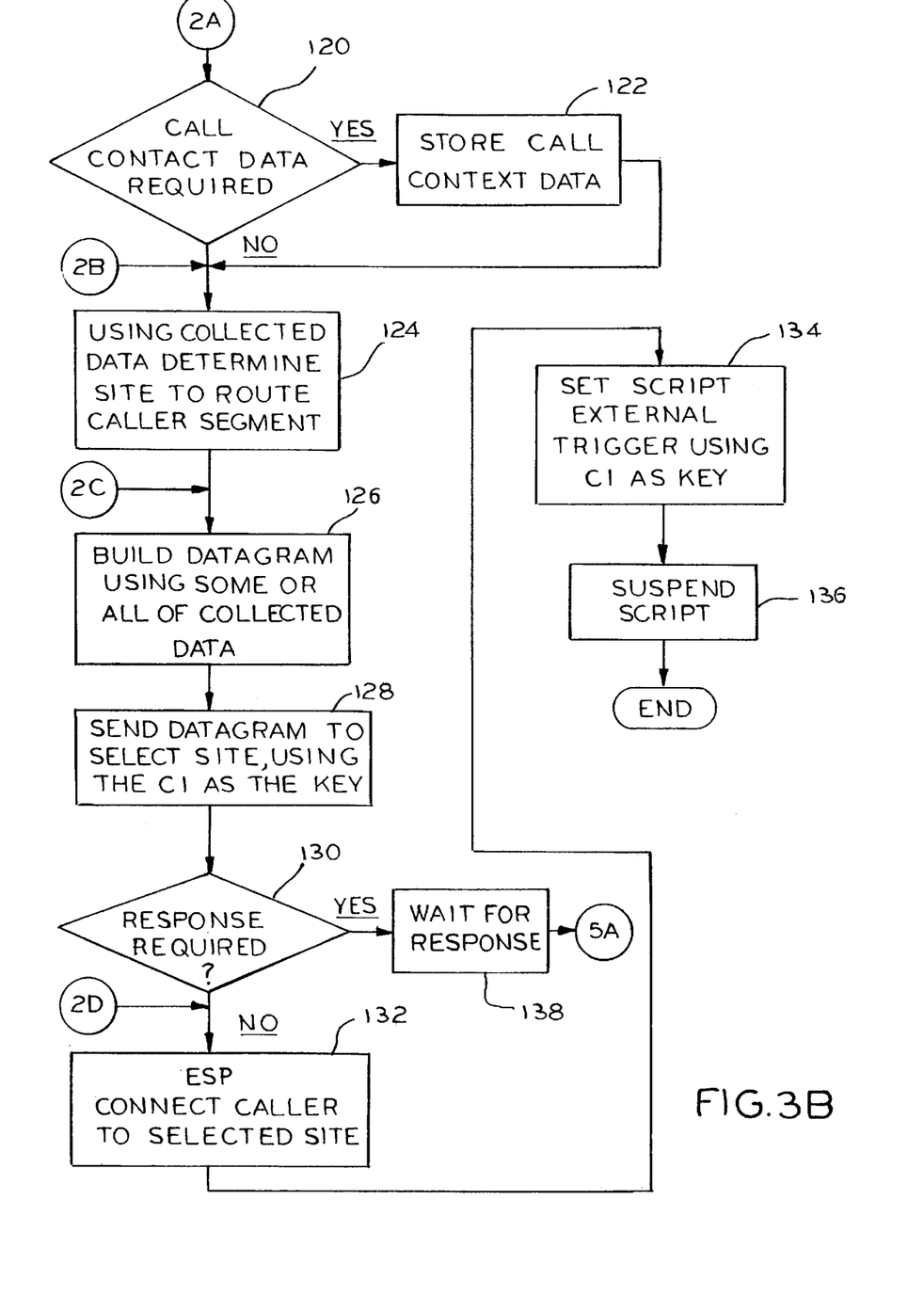

Once all of the above information has been collected and stored, then that same information is used to determine the subscriber resource to route the caller segment at a block 124. All of the data used in making the determination is stored throughout the life of the call. Once the resource is selected, then a query datagram is built at a block 126. The query datagram includes the following elements:

routing header stack
  call identification number (CI)
  message type code
  automatic call identification of original call
  request type (non-negotiation or negotiation)
  iformation collected by the ESP (data used at block 124)

The query datagram is then sent to the selected site at a block 128 via the data network 20. The ID for the caller, labelled CI, is used as a key for identifying the call. A decision block 130 then determines whether a response to the query datagram is required. A response is required only if the call is to be negotiated. If a response is not required, then the ESP connects the caller to the selected site at a block 132. The script is then set to enable receipt of an external trigger using the CI value as a key at a block 134. The script is then suspended relative to this call at a block 136 and the ESP script routine ends.

Returning to the decision block 130, if a response from the selected site is required, then the control waits for a response at a block 138. Once a response is received, then the returned datagram data is stored at a block 140, see FIG. 3D. The returned datagram can be an accept datagram or a reject datagram. The format of an accept datagram is as follows:

routing header stack
    call identification number (CI)
    message type code
    accept code The format for the reject datagram is as follows:

routing header stack
    call identification number (CI)
    message type code
    automatic call identification of original call
    reject code
        site determines new destination, including destination
        network determines new destination
        queue the call at the ESP
    information collected by site The stored data is analyzed at a block 142. A decision block 144 determines if the site has rejected the call. If not, then control proceeds to block 132 of FIG. 3B to connect the call. If the site has rejected the call, then a decision block 146 determines if the reject includes a specific transfer to another location. If so, then control proceeds to the block 126 of FIG. 3B to reroute the call to the specific site. If a specific transfer site was not returned, then a new site to route the caller segment is determined at a block 148. This determination is similar to the one made at the block 124 of FIG. 3B. Once the site has been determined, then the control proceeds to the block 126 of FIG. 3B.

Figure 3C:
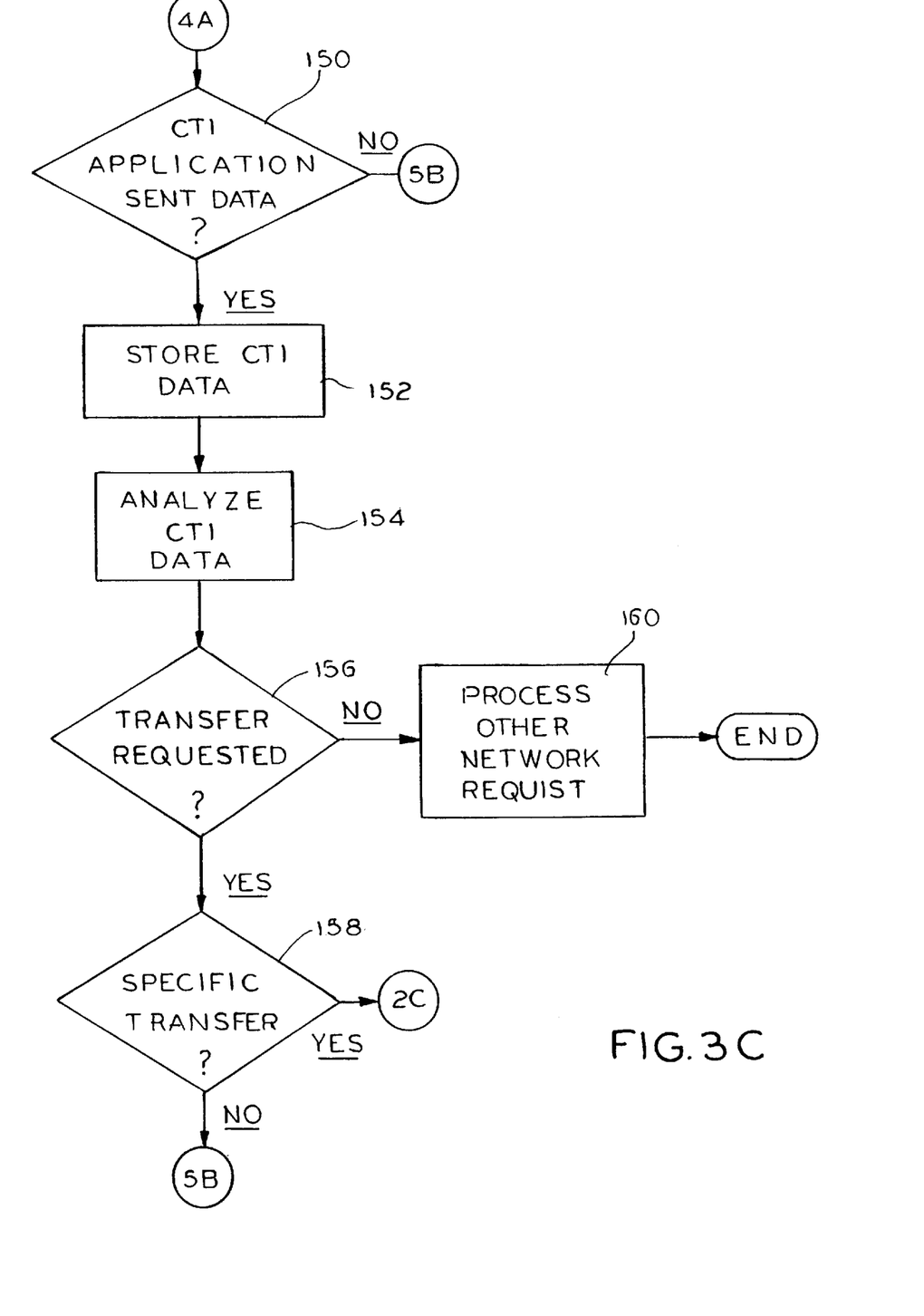
Figure 3D:
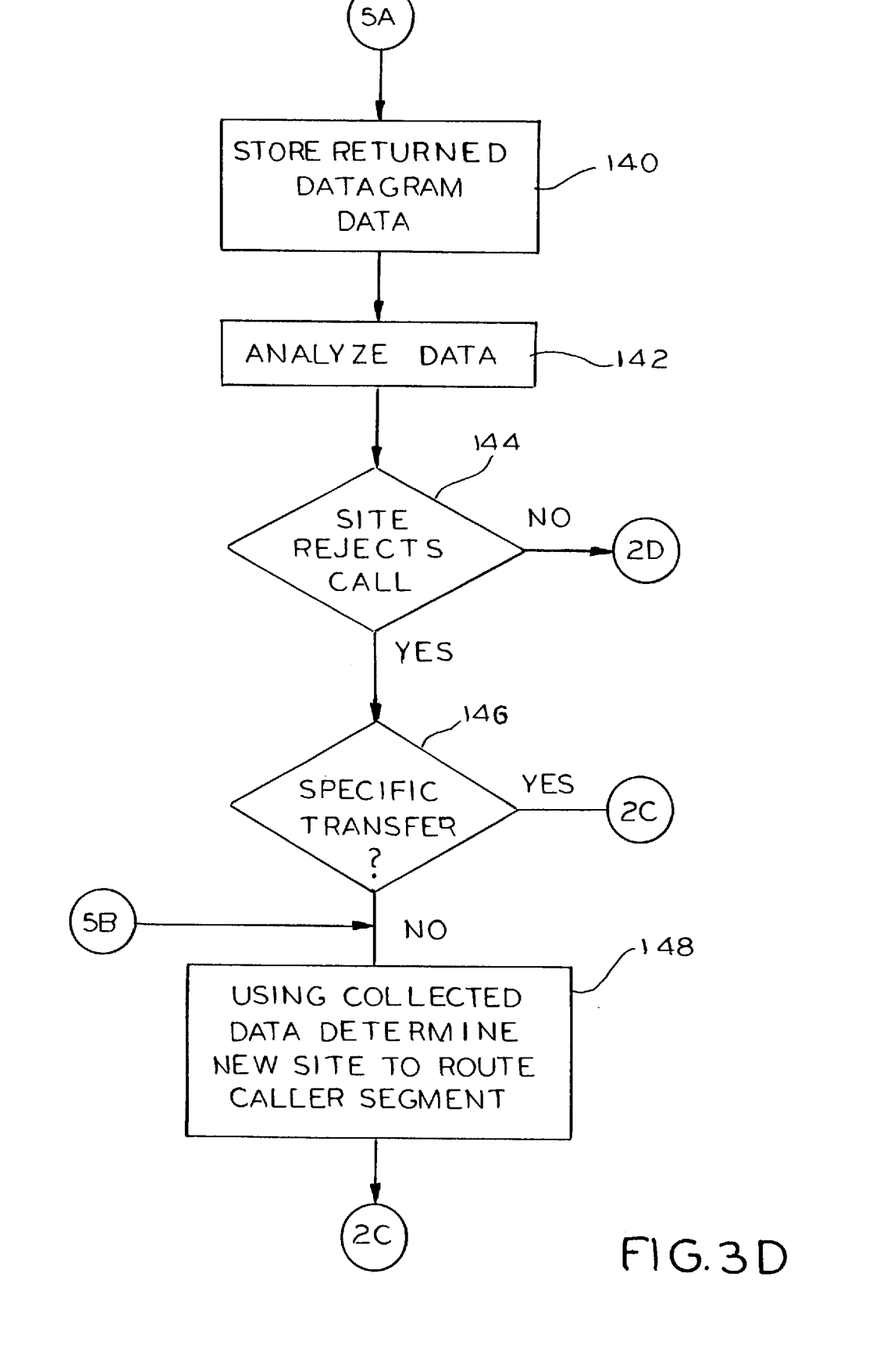

Returning to FIG. 3A, if the ESP script was started by an external trigger, then control proceeds to a decision block 150 of FIG. 3C. A decision is made if the CTI application returned data. If not, then control proceeds to the block 148 of FIG. 3D to make a routing decision. If data was sent, then the CTI returned data is stored at a block 152 and analyzed at a block 154. A decision block 156 then determines if a transfer is requested. If so, then a decision block 158 determines if the transfer was to a specific location. If so, then control proceeds to the block 126 of FIG. 3B. If not, then control proceeds to the block 148 of FIG. 3D. If no transfer was requested, at the block 156, then the particular network request is processed at a block 160. This other network request can take one of many forms. For example, the request could be to consult with another site prior to acting on the call, or conduct a conference with another site. Alternative requests could be acted on at this point. The routine then ends.

Figure 4A:
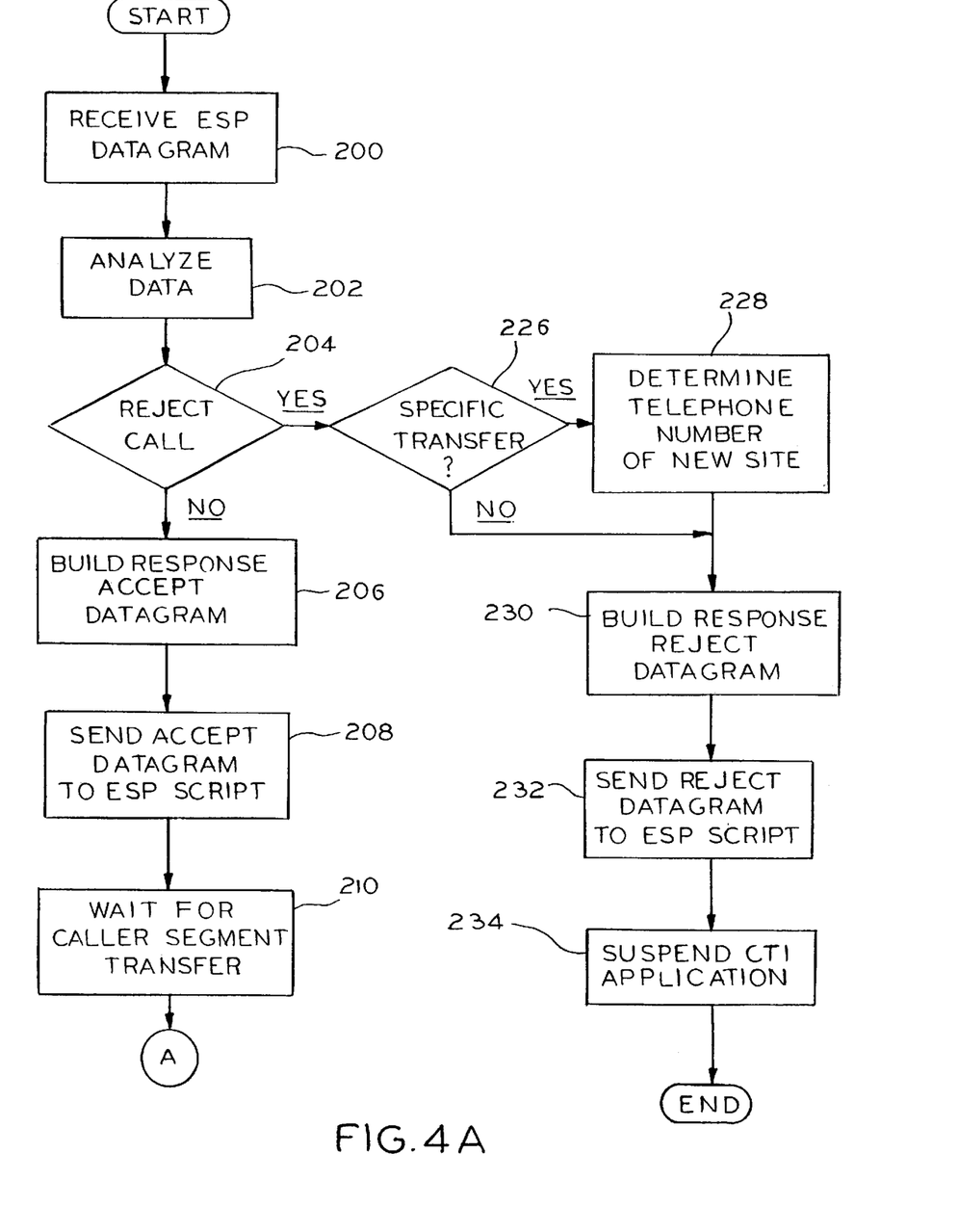
FIGS. 4A–4B comprise a flow diagram illustration operation of a program implemented by the CTI application of FIG. 1.
Figure 4B:
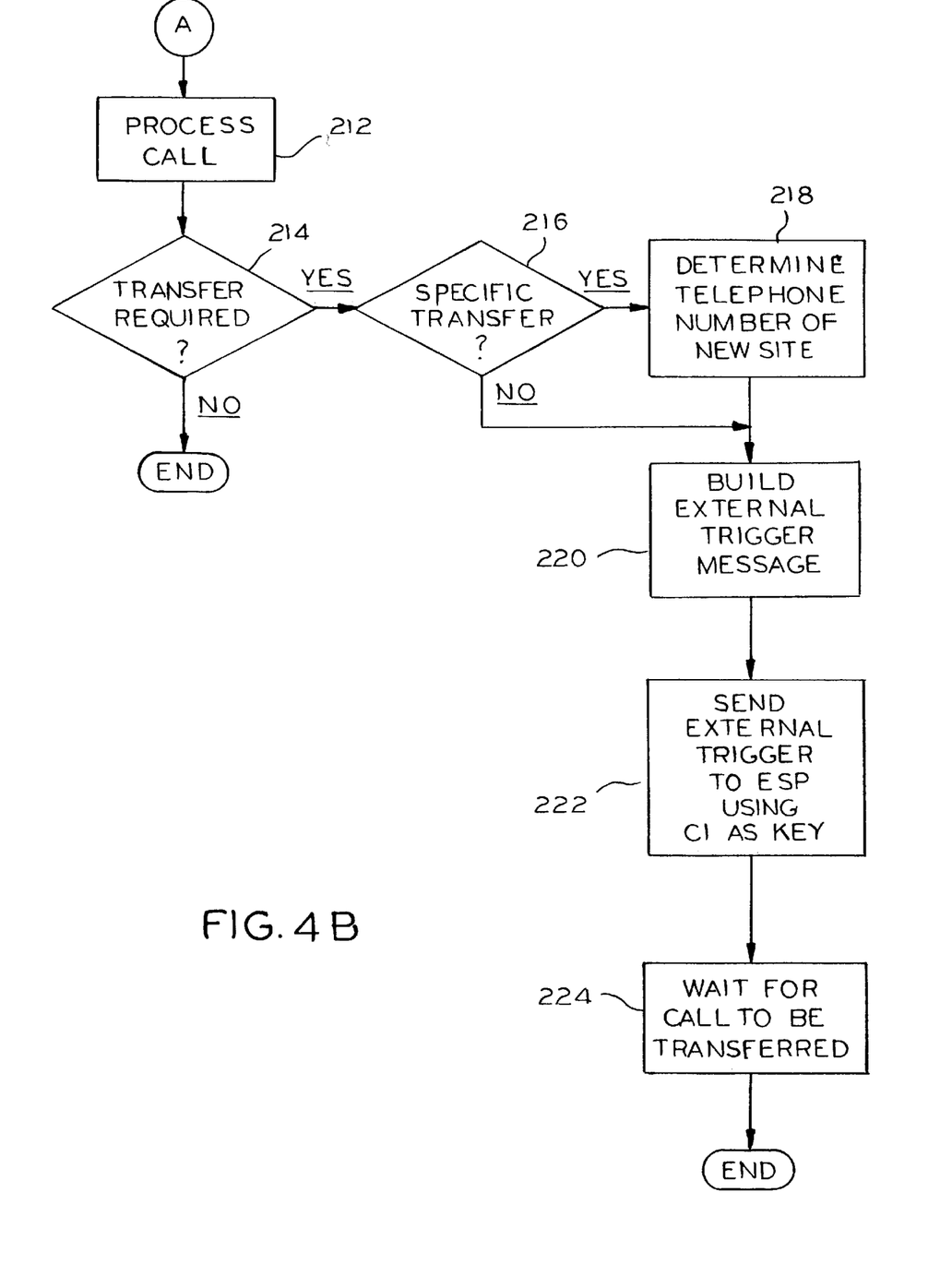

Referring now to FIGS. 4A and 4B, a flow diagram illustrates operation of the script implemented in one of the CTI applications 30 for handling a call. The control begins at a block 200 when a query datagram is received from the ESP 16. The data included in the datagram is analyzed at a block 202. A decision block 204 then determines whether or not to reject the call. The call might be rejected, for example, if there are not enough agents, or agents have changed locations without telling the network, or if the particular site is closed. If the call is not rejected, then a response in the form of an accept datagram is built at a block 206. The accept datagram is sent to the ESP script at a block 208. The control then waits for the caller segment transfer at a block 210.

Once the caller segment has been transferred, then the call is processed by the agent at a block 212. A decision block 214 determines if a transfer is ever required prior to termination of the call. If not, then the routine ends. If during the call process a transfer is requested, then a decision block 216 determines if the transfer is a specific transfer to a particular location. This might be done, for example, if the agent receiving the call determines that a specific resource ought be used to handle the call. If a specific transfer is required, then the telephone number of the new site is determined at a block 218. Thereafter, or if no specific transfer is required, then an external trigger message is built at a block 220. The external trigger message includes the following elements:

routing header stack
    call identification number (CI)
    message type code
    automatic call identification of original call
    service request code
        1. transfer call
            a. site determines new destination, including destination
            b. network determines new destination
        2. consult with new site, including destination
        3. conference with new site, including destination information collected by site The external trigger is sent to the ESP at a block 222, again using the call identification number CI as the key. The application then waits for the call to be transferred at a block 224 and the script then ends.

Returning to the decision block 204, if the call is rejected, then a decision block 226 determines if the call should be transferred to a specific location. If so, then the telephone number of the new site is determined at a block 228. A response reject datagram is then built at the block 230. The reject datagram is sent to the ESP script at the block 232. The CTI application is suspended at block 234 and the routine ends.

With the system as described, the algorithms that are executed within the ESP 16 have the capability to access both the PSTN 10 and the subscriber data network 20. The algorithms are built from individual service building blocks (SBB). SBB's may be arranged in different combinations and sequences to create the desired telephone service. Examples of the types of network primitives supported by the SBB's are making a call, setting an external trigger, sending or receiving a datagram, or querying a subscriber call routing process, such as disclosed in U.S. Pat. No. 5,452,350 for a destination. Examples of telephone services that can be created by combining SBB's in specific sequences are calling card applications, network call prompters and personal communication services.

The ESP 16 is an existing adjunct processor associated with a network switch 14 and enhanced to process datagrams and external trigger messages. The adjunct processor must at a minimum support transferring, conferring and bridging of calls, network interactive voice response applications and intelligent call routing.

The flow charts discussed above describe the individual operations performed at the CTI application 30 and the ESP 16. The following procedure describes handling of the call within the entire subscriber system.

Once a call has been received, the ESP 16 determines the destination to route the segment, for example, site 1. The ESP may use any of the following information to aid in selecting the destination:

1. Information obtained from a dialog with the customer using the ESP as an interactive voice response unit.

2. Data obtained from querying the database 40.
3. Data secured from the resource allocator 64.
4. Data received the CTI application 30.
5. Call context data, i.e. ANI, II, call number, etc.

Before routing the customer's voice segment to the selected site, the ESP builds a query datagram that contains some or all of the information collected above. The query datagram is identified by the call identification number CI. The CI number is unique across the total network and is generated by the ESP. The query datagram is transmitted from the ESP 16 to the select site across the sites associated data link 32-1. The ESP 16 and to some extent the CTI application 30-1 control the disposition of the customer's voice segment. This is a cooperative process between the two applications. The query datagram is the method utilized by the ESP 16 to convey information about the call to the CTI application 30-1 so that the application can determine how best to process the call. The query datagram may have various meanings based upon the state of the cooperative process and the conditions at the site.

One meaning of the query datagram may dictate that the voice segment will be routed to the site without the sites approval. The datagram in this instance functions as a pre-alert to the routing of the voice segment. The datagram contains all the necessary information to begin preliminary processing of the customers request prior to the destination receiving the customer's voice segment. The local process may include such tasks as accessing a local database that contains customer information or reserving a specific agent connected to the CBX 24-1 to receive the customer's call. Immediately upon sending the datagram to the destination, the ESP routes the customer's voice segment to the site using the site's associated voice link 42-1. The voice segment is terminated at the site's CBX 24-1 as identified to the CBX 24-1 by the CI number generated by the ESP 16. The Cl number for the voice segment is conveyed to the site in either the automatic number identification data element or the ISDN user-to-user field in the call setup message.

A different meaning of the query datagram may indicate that the datagram is a query to the site to determine if the site can accept the voice segment that is queued at the ESP 16. In this instance, the voice segment is not delivered to the site until the site responds to the initial query datagram. The response from the site will indicate to the ESP the future disposition of the call. The site will direct the ESP 16 to route the call to the original site, reroute the call to another destination, let the network determine the destination, route the call to network treatment and/or hold the call in the network until a site accepts the call. The CTI application 301 responds to the datagram indicating the disposition of the customer's voice segment. The CTI application 30-1 may also return any locally accessed data to the ESP 16 for further processing of the call.

If the site responds with a reject datagram, then the voice segment processing then returns to again make a routing determination. However, if the site returns a specific site for the new destination, the process will bypass this selection and begin the processing for the new site using call negotiation if required. If the site responds with an accept datagram, then the ESP makes a call to the site on a separate trunk in the ESP 16 and bridges the customer's voice segment to the site's voice segment in the ESP. The site's voice segment terminates on the CBX 24-1 at the site.

After the ESP 16 routes the customer's voice segment to the destination it sets an external trigger. The external trigger is the mechanism that the CTI application 30-1 uses to communicate voice network requests to the ESP 16 for an individual voice segment. The identification of the trigger is the same CI number that was assigned to both the datagram and the associated voice segment in the original call. The external trigger requests flows along the site's associated data link 32-1 through the network server 22 to the ESP 16. The request contains the necessary information for the processing of the call, i.e. service request code and any data collected at the destination during the processing of the call. The data may be used by the ESP or may be forwarded to another destination and a new datagram.

The voice segment routed to the site is identified by the CI number generated by the ESP 16. The Cl number may be transmitted to the site either as the automatic number identification, ANI, for the voice segment or in the user-to-user information field of an ISDN setup message if the site is connected to the switch through an ISDN circuit. The CI number of the voice segment matches the CI number in the initial datagram. Therefore, the CTI application 30-1 can match the correct query datagram with its associated voice segment thus combining the information in the datagram and any locally accessed data with the call. The CTI application 30-1 bridges the customer's call to a telephone agent 26-1 connected to the PBX 24-1. During the conversation with the customer, the agent may decide that the original call must be transferred to another site to be serviced. The agent through the data terminal 34-1 signals the CTI application 30-1 to inform the network to locate a new destination to terminate the call. The CTI application 30-1 constructs an external trigger message and sends it to the ESP 16 through the network server 22. The external trigger message is identified the CI number that was sent to the site with the customer's voice segment. The CTI application 30-1 may also forward to the ESP 16 any data that has been collected by the local process. This information may be used by the ESP 16 or it may be forwarded to the next site.

The external trigger associated with the customer's voice segment is executed by an ESP process. The process disconnects the customer's voice segment from the CBX 24-1 and queues the segment on the ESP. The ESP process starts the destination selection over for the CTI application transfer request. The ESP process can again determine a new destination or if the site returned a specific destination, immediately begin processing of the new site.

Thus, in accordance with the invention there is disclosed a subscriber call routing system which uses third party call control for determining the handling of a call subsequent to receipt by the subscriber.

I claim:

1. A subscriber call routing system for routing calls initiated in a carrier public switched telephone network (PSTN) to any of a plurality of different subscriber resources for a subscriber number, comprising:

receive processing means for receiving a connection request from the PSTN for any call placed to the subscriber number, said connection request including call identification information including indicia relating to the call, and developing a routing request;

routing processing means operatively associated with the receive processing means and responsive to a routing request and using a stored routing algorithm for selecting one of the subscriber resources to receive the call, the routing processing means including means for transmitting a request to the selected subscriber resource for acceptance of the call;

telephone interface processing means operatively associated with each of said subscriber resources for receiving requests from the routing processing means for acceptance of the call and returning an acceptance command to the routing processing means to accept the call or returning a rejection command to the routing processing means to reject the call; and the receive processing means sending a response to the PSTN designating the selected subscriber resource to receive the call responsive to receiving the acceptance command or developing a further routing request responsive to receiving the rejection command.

2. The subscriber call routing system of claim 1 wherein said receive processing means includes means for assigning a unique ID to the call, the ID remaining with the call throughout existence of the call.

3. The subscriber call routing system of claim 1 wherein said telephone interface processing means includes means for transferring a routing request to the routing processing means to reroute a call previously received by its associated subscriber resource.

4. The subscriber call routing system of claim 3 wherein the routing request transferred from the telephone interface means identifies a specific subscriber resource to receive the call.

5. The subscriber call routing system of claim 1 wherein the rejection command transferred from the telephone interface means identifies a specific subscriber resource to receive the call.

6. The subscriber call routing system of claim 1 further comprising means for storing the call identification information, the stored identification information being used by the routing processing means for selecting one of the subscriber resources to receive the call.

7. The subscriber call routing system of claim 6 wherein the telephone interface processing means includes means for updating the stored call identification information during processing of the call.

8. The subscriber call routing system of claim 1 wherein the telephone interface means is adapted to begin local processing of the call prior to the call arriving at the selected resource.

* * * * *